(12) United States Patent
Yang

(10) Patent No.: US 12,166,372 B2
(45) Date of Patent: Dec. 10, 2024

(54) LINEAR CHARGER WITH THERMAL REGULATION CIRCUIT

(71) Applicant: Elite Semiconductor Microelectronics Technology Inc., Hsinchu (TW)

(72) Inventor: Yao-Wei Yang, Hsinchu (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 606 days.

(21) Appl. No.: 17/561,685

(22) Filed: Dec. 23, 2021

(65) Prior Publication Data

US 2023/0208180 A1 Jun. 29, 2023

(51) Int. Cl.
*H02J 7/00* (2006.01)
(52) U.S. Cl.
CPC .... *H02J 7/007192* (2020.01); *H02J 7/00714* (2020.01); *H02J 7/007182* (2020.01)
(58) Field of Classification Search
CPC ............ H02J 7/00041; H02J 7/007192; H02J 7/007194; H02J 7/00309; H02J 7/00714; H02J 7/007182; H02J 7/04
USPC ......................................................... 320/150
See application file for complete search history.

(56) References Cited

U.S. PATENT DOCUMENTS

| 5,444,378 A | * | 8/1995 | Rogers | .............. | H02J 7/007194 |
| | | | | | 320/150 |
| 2014/0266015 A1 | * | 9/2014 | Newlin | .............. | H02J 7/007192 |
| | | | | | 320/153 |

FOREIGN PATENT DOCUMENTS

| CN | 102148520 A | 8/2011 |
| CN | 102412611 A | 4/2012 |
| CN | 105207323 A | 12/2015 |

* cited by examiner

*Primary Examiner* — Paul Dinh
(74) *Attorney, Agent, or Firm* — Winston Hsu

(57) ABSTRACT

A linear charger includes a constant current charging circuit and a thermal regulation circuit. The constant current charging circuit is arranged to generate a charging current, and includes a first transconductance amplifier, wherein the first transconductance amplifier has a positive terminal, a negative terminal, and an output terminal. The thermal regulation circuit is coupled to the output terminal and the negative terminal of the first transconductance amplifier, and is arranged to generate and modulate a thermal regulation current and an amplifier reference voltage with temperature, and transmit the thermal regulation current and the amplifier reference voltage to the output terminal and the negative terminal of the first transconductance amplifier, respectively.

10 Claims, 5 Drawing Sheets

LINEAR CHARGER WITH THERMAL REGULATION CIRCUIT

BACKGROUND OF THE INVENTION

1. Field of the Invention

The present invention is related to a linear charger, and more particularly, to a linear charger with a thermal regulation circuit.

2. Description of the Prior Art

A linear charger may include a constant current charging circuit and a constant voltage charging circuit. The linear charger may charge a battery in a constant current mode by using the constant current charging circuit, and may charge the battery in a constant voltage mode by using the constant voltage charging circuit. When the charging current for charging the battery becomes larger, the ambient temperature of the chip of the linear charger will increase, which may cause damage to the chip of the linear charger. As a result, a thermal regulation circuit may be coupled to the constant current charging circuit to control the temperature of the chip.

A typical thermal regulation circuit usually only modulates one of the voltages at a negative terminal or a positive terminal of an amplifier in the constant current charging circuit through a zero-temperature coefficient reference voltage of the linear charger and a temperature sensing voltage of the linear charger, wherein a setting resistor for setting the charging current is coupled to the positive terminal of the amplifier. Some problems may occur, however. If only the voltage of the positive terminal of the amplifier is modulated with temperature, a shutdown temperature of the linear charger may change with different values of the setting resistor. On the other hand, if only the voltage of the negative terminal of the amplifier is modulated with temperature, the power stage of the linear charger may not be turned off at high temperature due to the offset voltage in the constant current mode. In addition, the modulation of the voltage at the negative terminal of the amplifier with temperature is nonlinear, which makes it difficult to estimate the magnitude of the charging current at various temperatures. As a result, a novel linear charger with thermal regulation mechanism is urgently needed to address the above-mentioned issues.

SUMMARY OF THE INVENTION

It is therefore one of the objectives of the present invention to provide a linear charger with a thermal regulation circuit, to address the above-mentioned issues.

According to one embodiment of the present invention, a linear charger is provided. The linear charger may include a constant current charging circuit and a thermal regulation circuit. The constant current charging circuit may be arranged to generate a charging current, and may include a first transconductance amplifier, wherein the first transconductance amplifier has a positive terminal, a negative terminal, and an output terminal. The thermal regulation circuit may be coupled to the output terminal and the negative terminal of the first transconductance amplifier, and may be arranged to generate and modulate a thermal regulation current and an amplifier reference voltage with temperature, and transmit the thermal regulation current and the amplifier reference voltage to the output terminal and the negative terminal of the first transconductance amplifier, respectively.

One of the benefits of the present invention is that, a shutdown temperature of the linear charger of the present invention is unchanged for different values of the setting resistor for setting the charging current, wherein the setting resistor is coupled to the positive terminal of the transconductance amplifier in the constant current charging circuit of the linear charger. By modulating the thermal regulation current with temperature, the modulation of a setting voltage at the positive terminal of the transconductance amplifier in the constant current charging circuit of the linear charger with temperature may become linear, which makes it easy to estimate the magnitude of the charging current at various temperatures, and the modulation of the charging current with temperature is linear. In addition, the shutdown temperature of the linear charger is unchanged for the charging current corresponding to different current values, and a power stage of the linear charger is guaranteed to be turned off at high temperature.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
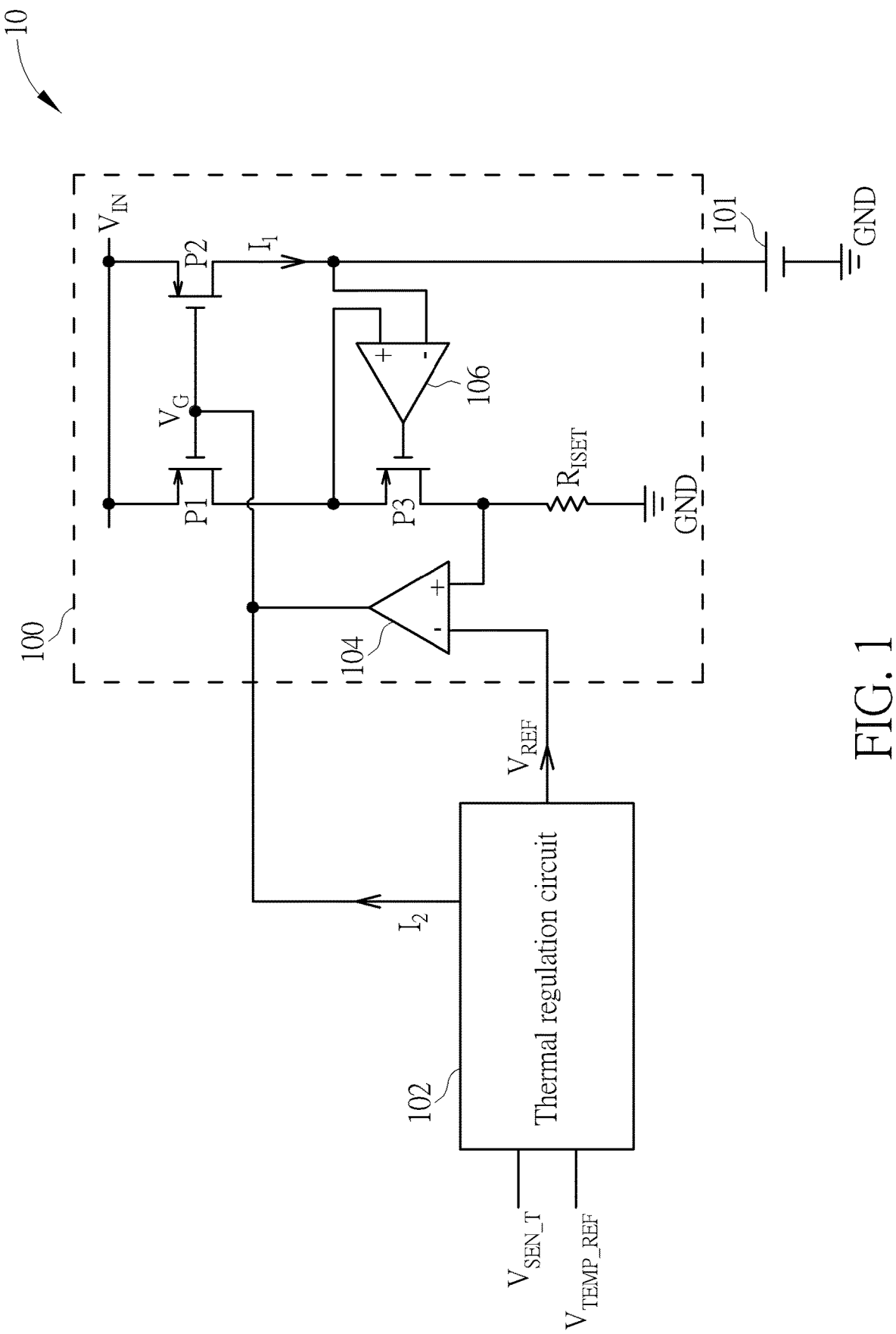
FIG. 1 is a diagram illustrating a linear charger according to an embodiment of the present invention.

FIG. 1 is a diagram illustrating a linear charger 10 according to an embodiment of the present invention. As shown in FIG. 1, the linear charger 10 may include a constant current charging circuit 100 and a thermal regulation circuit 102. In practice, the linear charger 10 may further include a constant voltage charging circuit (not shown). Since the present invention focuses on the thermal regulation design for the constant current charging circuit, further description of the constant voltage charging circuit is omitted for brevity.

The constant current charging circuit 100 may include a plurality of P-type transistors P1, P2, and P3, a transconductance amplifier 104, an operation amplifier 106, and a setting resistor $R_{ISET}$. The P-type transistor P1 has a source terminal coupled to a first reference voltage (e.g. an input voltage $V_{IN}$). The P-type transistor P2 has a source terminal coupled to the first reference voltage (e.g. the input voltage $V_{IN}$), and a gate terminal coupled to a gate terminal of the P-type transistor P1, wherein a gate voltage $V_G$ is a voltage at a node between the gate terminal of the P-type transistor P1 and the gate terminal of the P-type transistor P2, and a charging current $I_1$ is output from a drain terminal of the P-type transistor P2. The P-type transistor P3 has a source terminal coupled to a drain terminal of the P-type transistor P1.

The transconductance amplifier 104 has a positive terminal (+) coupled to a drain terminal of the P-type transistor P3, a negative terminal (−) coupled to an amplifier reference voltage $V_{REF}$, and an output terminal coupled to the gate terminal of the P-type transistor P1. The operation amplifier 106 has a positive terminal (+) coupled to the source terminal of the P-type transistor P3, a negative terminal (−) coupled to the drain terminal of the P-type transistor P2 and a battery 101, and an output terminal coupled to a gate terminal of the P-type transistor P3. The setting resistor $R_{ISET}$ has a first terminal coupled to the positive terminal of the transconductance amplifier 104, and a second terminal coupled to a second reference voltage (e.g. a ground voltage GND), and may be arranged to set the charging current $I_1$ of the battery 101.

The thermal regulation circuit 102 may be coupled to the output terminal and the negative terminal of the transconductance amplifier 104, and may be arranged to generate and modulate a thermal regulation current $I_2$ and the amplifier reference voltage $V_{REF}$ with temperature, and transmit the thermal regulation current $I_2$ and the amplifier reference voltage $V_{REF}$ to the output terminal and the negative terminal of the transconductance amplifier 104, respectively. In addition, the thermal regulation circuit 102 may receive a temperature sensing voltage $V_{SEN\_T}$ and a temperature reference voltage $V_{TEMP\_REF}$, and modulate the thermal regulation current $I_2$ and the amplifier reference voltage $V_{REF}$ according to the temperature sensing voltage $V_{SEN\_T}$ and the temperature reference voltage $V_{TEMP\_REF}$, wherein the temperature reference voltage $V_{TEMP\_REF}$ is approached to the zero-temperature coefficient reference voltage, and the temperature sensing voltage $V_{SEN\_T}$ is a temperature-dependent voltage. For example, the temperature sensing voltage $V_{SEN\_T}$ increases as the temperature rises, and decreases as the temperature falls.

Figure 2:
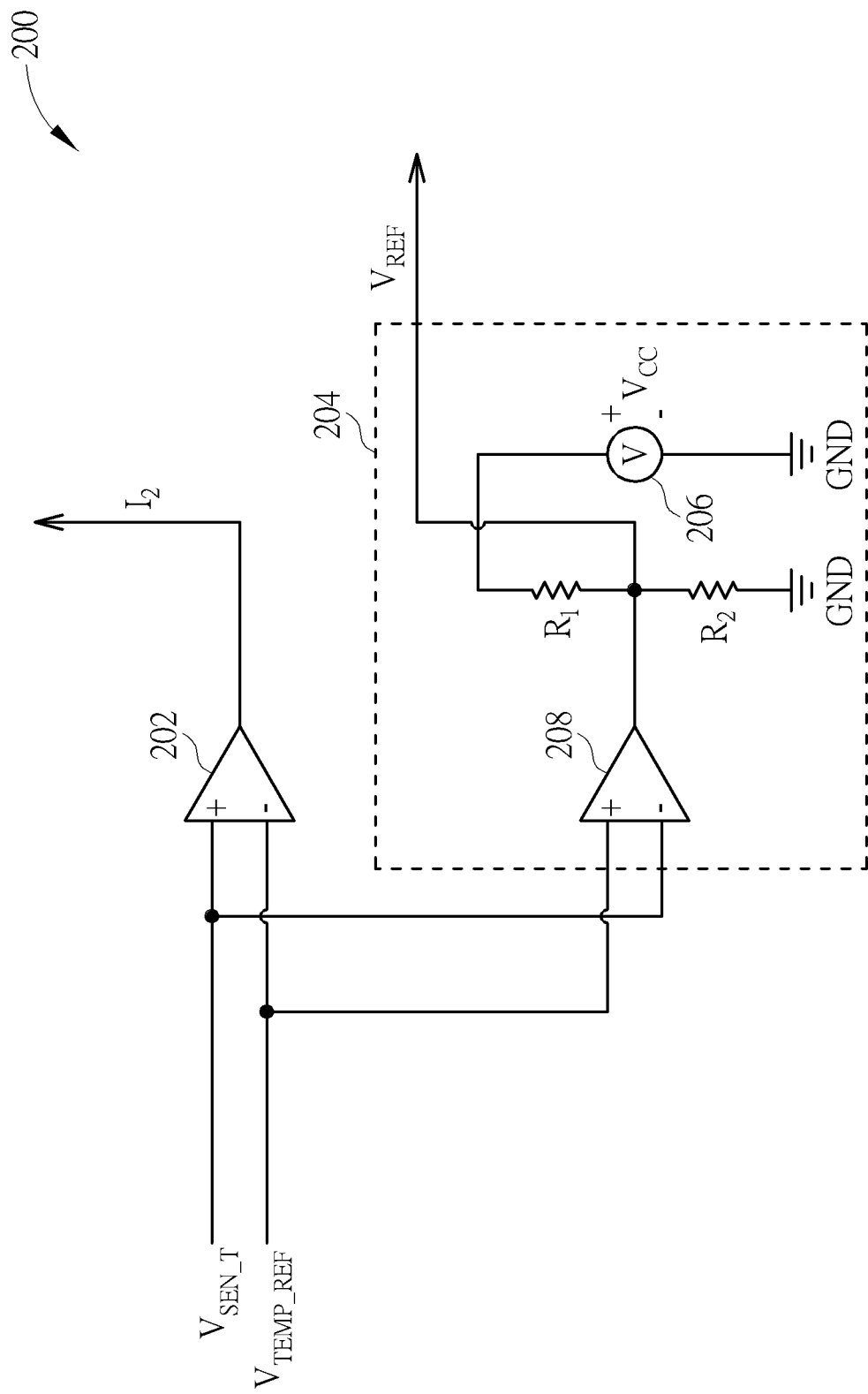
FIG. 2 is a diagram illustrating a thermal regulation circuit according to an embodiment of the present invention.

FIG. 2 is a diagram illustrating a thermal regulation circuit 200 according to an embodiment of the present invention. By way of example, but not limitation, the thermal regulation circuit 102 shown in FIG. 1 may be implemented by the thermal regulation circuit 200 shown in FIG. 2. As shown in FIG. 2, the thermal regulation circuit 200 may include a transconductance amplifier 202 and an amplifier reference voltage generation circuit 204. The transconductance amplifier 202 may be arranged to generate and modulate the thermal regulation current $I_2$ with temperature according to the temperature sensing voltage $V_{SEN\_T}$ and the temperature reference voltage $V_{TEMP\_REF}$. In addition, the transconductance amplifier 202 has a positive terminal (+) coupled to the temperature sensing voltage $V_{SEN\_T}$ and a negative terminal (−) coupled to the temperature reference voltage $V_{TEMP\_REF}$. As a result, the thermal regulation current $I_2$ may be modulated with temperature, as expressed by the following equation:

$$I_2 = \text{Max}[0, (V_{SEN\_T} - V_{TEMP\_REF})G_2]$$

wherein $G_2$ is a transconductance value of the transconductance amplifier 202.

The amplifier reference voltage generation circuit 204 may be arranged to generate and modulate the amplifier reference voltage $V_{REF}$ with temperature according to the temperature sensing voltage $V_{SEN\_T}$ and the temperature reference voltage $V_{TEMP\_REF}$. The amplifier reference voltage generation circuit 204 may include a voltage source 206, a transconductance amplifier 208, and a plurality of resistors $R_1$ and $R_2$. The voltage source 206 has a first terminal coupled to the second reference voltage (e.g. the ground voltage GND), and is arranged to provide a voltage $V_{CC}$. The resistor $R_1$ has a first terminal coupled to a second terminal of the voltage source 206, wherein the amplifier reference voltage $V_{REF}$ is output from a second terminal of the resistor $R_1$. The resistor $R_2$ has a first terminal coupled to the second terminal of the resistor $R_1$, and a second terminal coupled to the second reference voltage (e.g. the ground voltage GND). The transconductance amplifier 208 has a positive terminal (+) coupled to the temperature reference voltage $V_{TEMP\_REF}$, a negative terminal (−) coupled to the temperature sensing voltage $V_{SEN\_T}$, and an output terminal coupled to the second terminal of the resistor $R_1$, and may be arranged to generate and modulate the amplifier reference voltage $V_{REF}$ with temperature according to the temperature sensing voltage $V_{SEN\_T}$ and the temperature reference voltage $V_{TEMP\_REF}$. The amplifier reference voltage $V_{REF}$ may be modulated with temperature, as expressed by the following equation:

$$V_{REF} = \text{Min}\left\{[V_{CC} - (V_{SEN_T} - V_{TEMP_{REF}})G_3 R1] \times \left[\frac{R2}{R1+R2}\right], \frac{V_{cc} \times R2}{R1+R2}\right\}$$

wherein $G_3$ is a transconductance value of the transconductance amplifier 208, R1 is a resistance value of the resistor $R_1$, and $R_2$ is a resistance value of the resistor $R_2$.

Figure 3:
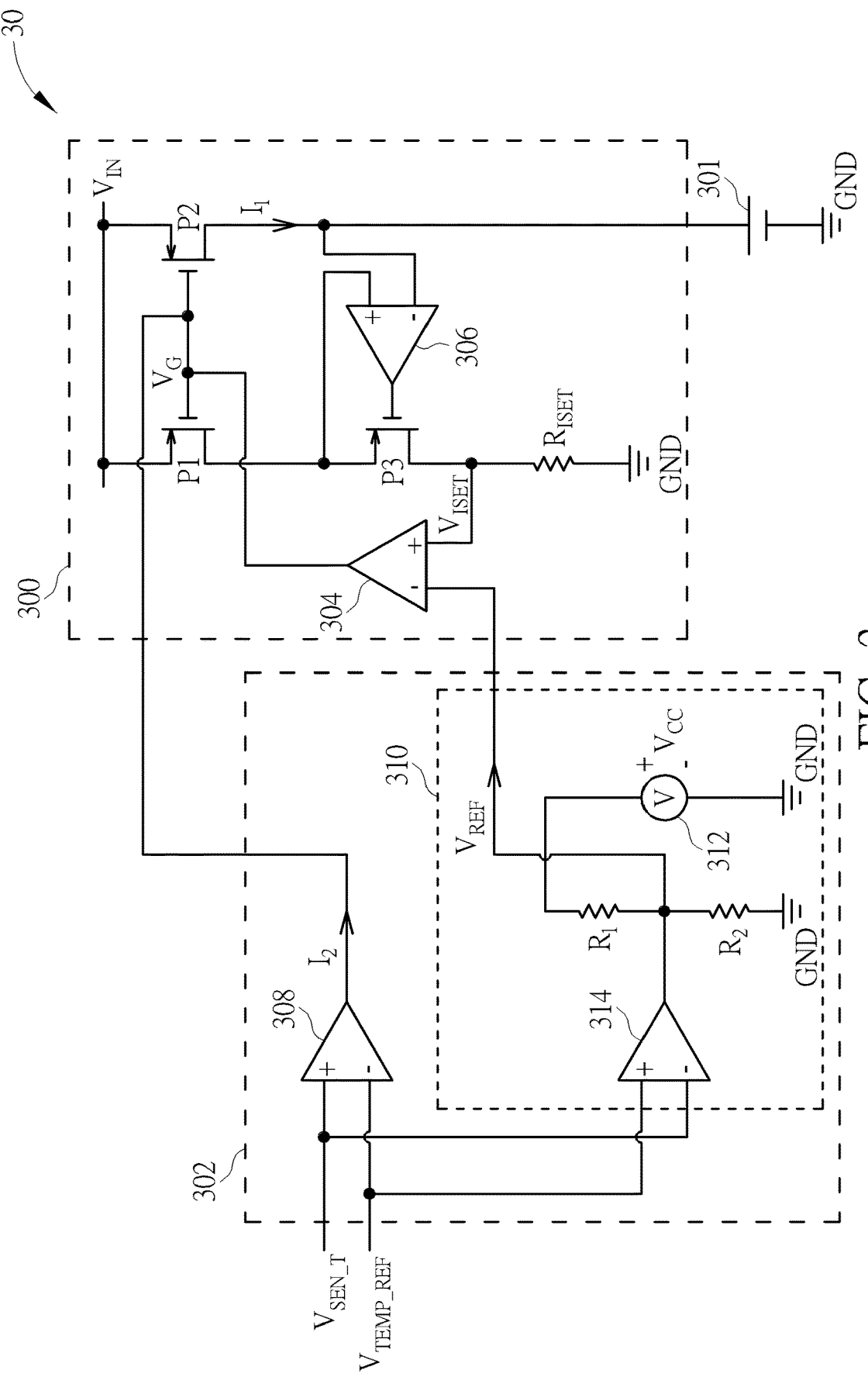
FIG. 3 is a diagram illustrating a linear charger with the thermal regulation circuit shown in FIG. 2 according to an embodiment of the present invention.

FIG. 3 is a diagram illustrating a linear charger 30 with the thermal regulation circuit 200 shown in FIG. 2 according to an embodiment of the present invention. As shown in FIG. 3, the linear charger 30 may include a constant current charging circuit 300 and the thermal regulation circuit 302, wherein the constant current charging circuit 300 and the thermal regulation circuit 302 may be implemented by the constant current charging circuit 100 shown in FIG. 1 and the thermal regulation circuit 200 shown in FIG. 2, respectively. The constant current charging circuit 300 may include a plurality of P-type transistors P1, P2, and P3, a transconductance amplifier 304, an operation amplifier 306, and a setting resistor $R_{ISET}$. For brevity, similar descriptions for this embodiment are not repeated in detail here. The thermal regulation circuit 302 may include a transconductance amplifier 308 and an amplifier reference voltage generation circuit 310, wherein an output terminal of the transconductance amplifier 308 may be coupled to the gate terminal of the P-type transistor P1 (i.e. coupled to the output terminal of the transconductance amplifier 304). The amplifier reference voltage generation circuit 310 may include a voltage source 312, a transconductance amplifier 314, and a plurality of resistors $R_1$ and $R_2$, wherein a node between the resistors $R_1$ and $R_2$ may be coupled to an output terminal of the transconductance amplifier 314 and a negative terminal of the transconductance amplifier 304. For brevity, similar descriptions for this embodiment are not repeated in detail here.

Considering a case where the thermal regulation circuit 302 is modified to only include the amplifier reference voltage generation circuit 310 (i.e. the thermal regulation circuit 302 only generates and modulates the amplifier reference voltage $V_{REF}$ with temperature, and transmits the amplifier reference voltage $V_{REF}$ to the negative terminal of the transconductance amplifier 304), the modulation of a setting voltage $V_{ISEt}$ at the positive terminal of the transconductance amplifier 304 with temperature is nonlinear, wherein the modulation of the setting voltage $V_{ISET}$ is controlled by the modulation of the amplifier reference voltage $V_{REF}$. To address this issue, the thermal regulation circuit 302 is configured to have the transconductance amplifier 308 and the amplifier reference voltage generation circuit 310, and may apply an offset voltage $\Delta V$ to the transconductance amplifier 304 by the thermal regulation current $I_2$ before modulation of the amplifier reference voltage $V_{REF}$ with temperature becomes nonlinear, to make modulation of the setting voltage $V_{ISET}$ with temperature linear, wherein a voltage value of the offset voltage $\Delta V$ is equal to a voltage value generated by subtracting the setting voltage $V_{ISET}$ from the amplifier reference voltage $V_{REF}$ at a same temperature (i.e. $\Delta V = V_{REF} - V_{ISET}$).

Figure 4:
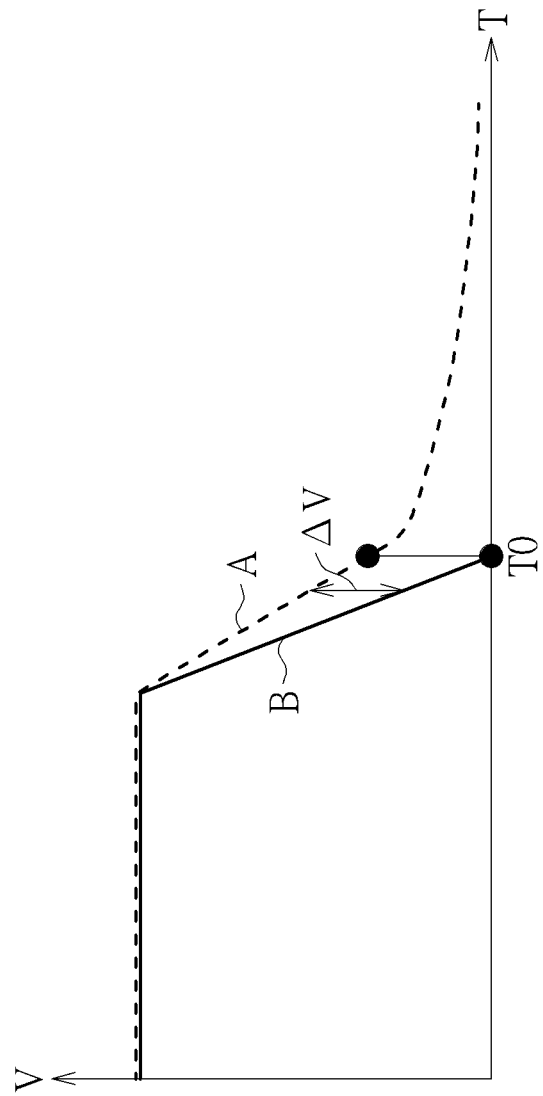
FIG. 4 is a diagram illustrating relationship between the offset voltage and modulation of the amplifier reference voltage and the setting voltage of the linear charger shown in FIG. 3 with temperature according to an embodiment of the present invention.

FIG. 4 is a diagram illustrating relationship between the offset voltage $\Delta V$ and modulation of the amplifier reference voltage $V_{REF}$ and the setting voltage $V_{ISET}$ of the linear charger 30 shown in FIG. 3 with temperature according to an embodiment of the present invention. As shown in FIG. 4, a dashed line A is the modulation of the amplifier reference voltage $V_{REF}$ with temperature, and a solid line B is the modulation of the setting voltage $V_{ISET}$ with temperature. By modulating the thermal regulation current $I_2$ with temperature, the offset voltage $\Delta V$ may be applied to the transconductance amplifier 304 before modulation of the amplifier reference voltage $V_{REF}$ with temperature becomes nonlinear (e.g. before the temperature of the linear charger 30 reaches a temperature T0 shown in FIG. 4), and the setting voltage $V_{ISET}$ is equal to 0V at the temperature TO. The offset voltage $\Delta V$ may be calculated by an equation as below:

$$\Delta V = (V_{SEN\_T} - V_{TEMP\_REF}) \frac{G_2}{G_1}$$

wherein $(V_{SEN\_T} - V_{TEMP\_REF}) \geq 0$, $G_1$ is a transconductance value of the transconductance amplifier 304, and $G_2$ is a transconductance value of the transconductance amplifier 308.

Figure 5:
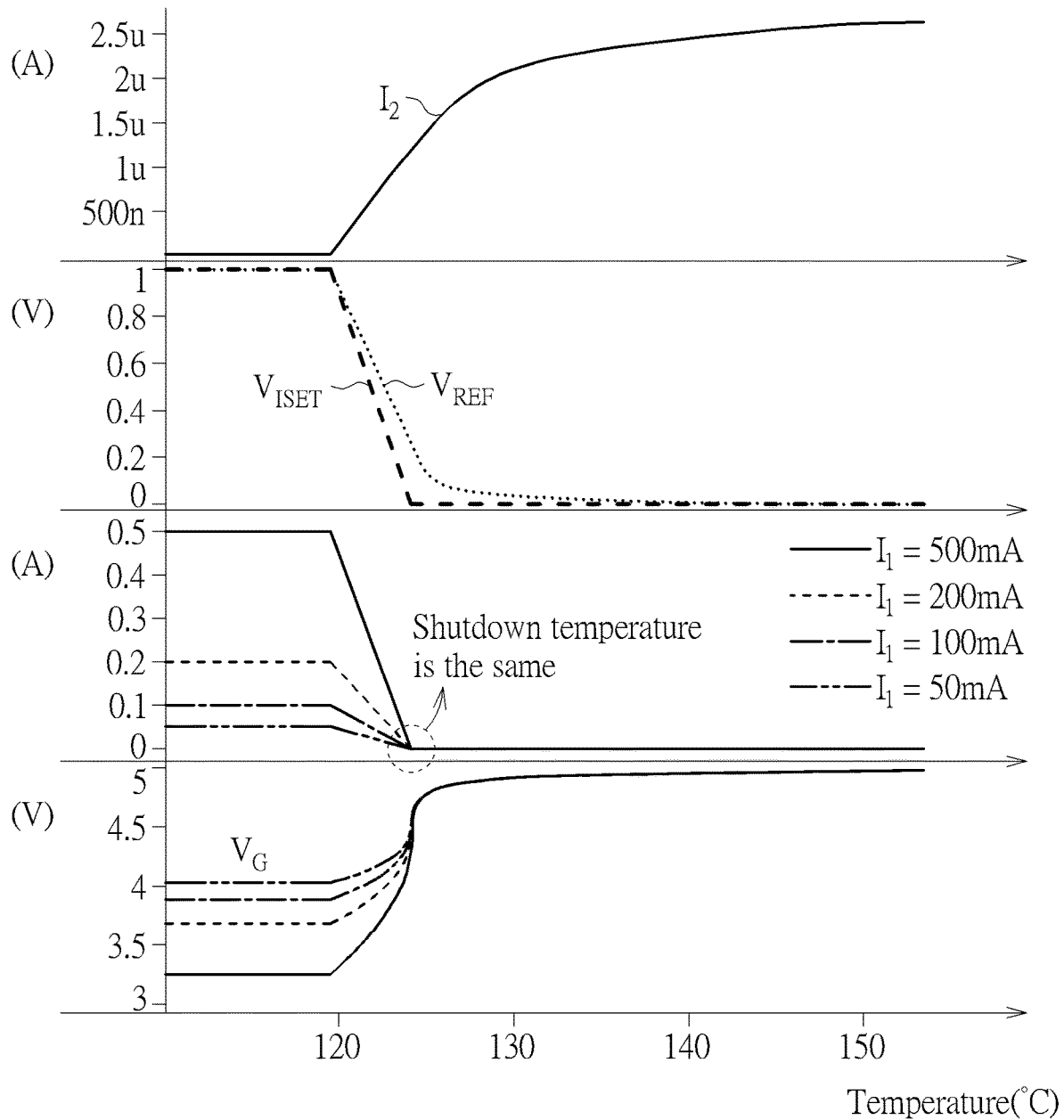
FIG. 5 is a diagram illustrating modulation of associated currents and voltages of the linear charger shown in FIG. 3 with temperature according to an embodiment of the present invention.

FIG. 5 is a diagram illustrating modulation of associated currents and voltages of the linear charger 30 shown in FIG. 3 with temperature according to an embodiment of the present invention. It is assumed that the input voltage $V_{IN}$ that is coupled to the source terminal of the P-type transistor P1 and the source terminal of the P-type transistor P2 is 5V. As shown in FIG. 5, by modulating the thermal regulation current $I_2$ with temperature, the modulation of the setting voltage $V_{ISET}$ with temperature may become linear, which makes it easy to estimate the magnitude of the charging current $I_1$ at various temperatures, and the modulation of the charging current $I_1$ with temperature is linear. In addition, a shutdown temperature of the linear charger 30 is unchanged for the charging current $I_1$ corresponding to different current values (e.g. 500 mA, 200 mA, 100 mA, and 50 mA). That is, the shutdown temperature of the linear charger 30 is unchanged for different values of the setting resistor $R_{ISET}$. For different gate voltages $V_G$ corresponding to different current values (e.g. 500 mA, 200 mA, 100 mA, and 50 mA) of the charging current $I_1$, a power stage of the linear charger 30 is guaranteed to be turned off at high temperature (i.e. the gate voltage $V_G$ is equal to the input voltage $V_{IN}$ at high temperature).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A linear charger, comprising:
   a constant current charging circuit, arranged to generate a charging current, wherein the constant current charging circuit comprises:
      a first transconductance amplifier, having a positive terminal, a negative terminal, and an output terminal; and
   a thermal regulation circuit, coupled to the output terminal and the negative terminal of the first transconductance amplifier, and arranged to generate and modulate a thermal regulation current and an amplifier reference voltage with temperature, and transmit the thermal regulation current and the amplifier reference voltage to the output terminal and the negative terminal of the first transconductance amplifier, respectively.

2. The linear charger of claim 1, wherein the constant current charging circuit further comprises:
   a first P-type transistor, having a source terminal coupled to a first reference voltage; and
   a second P-type transistor, having a source terminal coupled to the first reference voltage, and a gate terminal coupled to a gate terminal of the first P-type transistor;
   a third P-type transistor, having a source terminal coupled to a drain terminal of the first P-type transistor;
   an operation amplifier, having a positive terminal coupled to the source terminal of the third P-type transistor, a negative terminal coupled to a drain terminal of the second P-type transistor, and an output terminal coupled to a gate terminal of the third P-type transistor; and
   a setting resistor, having a first terminal coupled to the positive terminal of the first transconductance amplifier, and a second terminal coupled to a second reference voltage; wherein the positive terminal of the first transconductance amplifier is coupled to a drain terminal of the third P-type transistor, the negative terminal of the first transconductance amplifier is coupled to the second reference voltage, and the output terminal of the first transconductance amplifier is coupled to the gate terminal of the first P-type transistor.

3. The linear charger of claim 2, wherein a shutdown temperature of the linear charger is unchanged for different values of the setting resistor.

4. The linear charger of claim 2, wherein the charging current is output from the drain terminal of the second P-type transistor, and a shutdown temperature of the linear charger is unchanged for the charging current corresponding to different current values.

5. The linear charger of claim 4, wherein modulation of the charging current with temperature is linear.

6. The linear charger of claim 1, wherein the thermal regulation circuit comprises:
   a second transconductance amplifier, arranged to generate and modulate the thermal regulation current with temperature according to a sensing voltage and a temperature reference voltage, and having a positive terminal coupled to the sensing voltage, a negative terminal coupled to the temperature reference voltage, and an output terminal coupled to the output terminal of the first transconductance amplifier; and
   an amplifier reference voltage generation circuit, coupled to the negative terminal of the first transconductance amplifier, and arranged to generate and modulate the amplifier reference voltage with temperature according to the sensing voltage and the temperature reference voltage.

7. The linear charger of claim 6, wherein the amplifier reference voltage generation circuit comprises:
   a voltage source, having a first terminal coupled to a reference voltage;
   a first resistor, having a first terminal coupled to a second terminal of the voltage source, and a second terminal coupled to the negative terminal of the first transconductance amplifier;
   a second resistor, having a first terminal coupled to the second terminal of the first resistor, and a second terminal coupled to the reference voltage; and
   a third transconductance amplifier, arranged to modulate the amplifier reference voltage with temperature according to the sensing voltage and the temperature reference voltage, and having a positive terminal coupled to the temperature reference voltage, a negative terminal coupled to the sensing voltage, and an output terminal coupled to the second terminal of the first resistor.

8. The linear charger of claim 1, wherein an offset voltage is applied to the first transconductance amplifier by the thermal regulation current before modulation of the amplifier reference voltage with temperature becomes nonlinear, to make modulation of a setting voltage at the positive terminal of the first transconductance amplifier with temperature linear.

9. The linear charger of claim 8, wherein a voltage value of the offset voltage is equal to a voltage value generated by subtracting the setting voltage from the amplifier reference voltage.

10. The linear charger of claim 8, wherein a current value of the thermal regulation current is equal to a current value generated by multiplying a gain of the first transconductance amplifier and the offset voltage.

* * * * *